United States Patent [19]

Klein et al.

[11] 4,297,144
[45] Oct. 27, 1981

[54] HIGH SPEED CORRUGATING ADHESIVES

[75] Inventors: Gary H. Klein, LaGrange; Howard L. Arons, LaGange Park; Joseph F. Stejskal, Brookfield; Donald G. Stevens, Clarendon Hills; Henry F. Zobel, Darien, all of Ill.

[73] Assignee: CPC International Inc., Inglewood Cliffs, N.J.

[21] Appl. No.: 66,269

[22] Filed: Aug. 13, 1979

Related U.S. Application Data

[60] Continuation of Ser. No. 795,253, May 9, 1977, abandoned, which is a division of Ser. No. 598,095, Jul. 22, 1975, abandoned.

[51] Int. Cl.$^3$ .......................... C08L 1/26; C08L 3/06; C09J 3/06
[52] U.S. Cl. .................................. 106/197 C; 106/213
[58] Field of Search ............................ 106/213, 197 C

[56] References Cited

U.S. PATENT DOCUMENTS

| | | | |
|---|---|---|---|
| 2,914,526 | 11/1959 | Paschall | 536/110 |
| 3,015,572 | 1/1962 | Casey et al. | 106/197 C |
| 3,300,360 | 1/1967 | Williams | 156/293 |
| 3,355,307 | 11/1967 | Schoenberger et al. | 106/213 |
| 3,728,141 | 4/1973 | Ray-Chaudhuri et al. | 106/213 |
| 3,732,206 | 5/1973 | Kovats | 106/213 |
| 3,732,207 | 5/1973 | Kovats | 106/213 |
| 3,912,531 | 10/1975 | Musselman et al. | 106/213 |

FOREIGN PATENT DOCUMENTS

| | | |
|---|---|---|
| 2184455 | 12/1973 | France . |
| 631242 | 10/1949 | United Kingdom . |
| 434302 | 5/1976 | United Kingdom . |

*Primary Examiner*—Allan Lieberman

[57] ABSTRACT

High speed corrugating adhesives are provided based upon the use of certain specified saponifiable starch ester materials. These may be in the form of no-carrier type formulations, in which a single phase is present wherein the starch material is in the form of partially swollen granules. Alternatively, the formulation may have a carrier phase and an adhesive phase. The specific formulations described have superior properties that permit higher corrugating machine speeds.

15 Claims, No Drawings

HIGH SPEED CORRUGATING ADHESIVES

This is a continuation of application Ser. No. 795,253 filed May 9, 1977, which was a division of application Ser. No. 598,095 filed July 22, 1975, both now abandoned.

BACKGROUND OF THE INVENTION

This invention relates to starch-based corrugating adhesives and methods for their preparation. The invention is also concerned with methods of uniting articles, particularly laminated articles of fibrous, cellulosic webs, and more particularly, with the production of paperboard for use in the production of corrugated containers. The invention is also concerned with articles produced through the use of the new adhesive compositions.

One usual method of making corrugated board consists of corrugating a strip of paper by means of a corrugated roller, applying an adhesive to the tips of the flutes of the corrugations on one side and adhering another strip of paper called a "liner", to the flute tips by use of heat and under high pressure.

This product, called "single face" corrugated board may be used as is. However, it is usual to make "double face", also called "double back" board by sending the single face board into the second stage of the corrugating machine called the "double backer" stage. The term "single facer" generally refers to the first stage of the machine. An adhesive is applied to the opposite flute tips, and a second liner of paper is adhered to said opposite side by the use of heat and under a relatively small amount of pressure. The fact that the use of a great amount of pressure in the adherence of the second strip of paper would tend to crush the corrugations makes the adhesive problem in the second step quite difficult.

Starch-based corrugating adhesive formulations have been in wide use since the advent of the Stein-Hall technology, as disclosed in U.S. Pat. No. 2,051,025, granted Aug. 18, 1936, to J. V. Bauer, and U.S. Pat. No. 2,102,937, granted Dec. 21, 1937, also to J. V. Bauer.

A Stein-Hall type adhesive is a two component aqueous system. One component in this system is generally formed from a cooked, or gelatinized starch material, which serves as a carrier phase. Other materials which can form relatively viscous aqueous slurries, such as carboxymethyl cellulose, may also be used as a carrier phase.

The second component or phase is formed from a raw, ungelatinized starch material. This second phase is a latent or potential adhesive phase. That is, the adhesive characteristics of such a formulation are not fully developed until after the adhesive has been applied to the tips of the flutes of the corrugated web, the liner has been pressed against the adhesive-coated flutes, and heat and pressure have been applied; the heat causing the granular starch material to gelatinize and develop structure.

The swelling and gelatinization of the latent adhesive phase takes place as the newly assembled corrugated board is passed through a hot plate-dryer system that is associated with a corrugating machine. This system also partially dries the corrugated board and sets the adhesive sufficiently so that it can be subjected to subsequent operations, such as trimming, slitting, and sheeting without delamination.

The initial degree of cohesiveness in the bond of the corrugated board is referred to as the green bond strength. This characteristic determines the ability of the newly formed corrugated board to resist the instantaneous high shear forces that are developed during subsequent processing operations, such as the trimming, slitting, and sheeting operations, and is not necessarily an indication of the final bond strength.

Green bond strength, or for brevity, green strength, is a major limiting factor which controls the operating speed at which corrugated board may be manufactured on a given machine. As experienced machine operator often will operate a machine at the maximum speed of which it is capable without having the board delaminate during the trimming, slitting, and sheeting operations. Since the resistance to delamination is a characteristic that is directly dependent on green strength, the characteristics of the corrugating adhesive play a direct role in machine efficiency, which in turn determines the rate of return on the fixed investment represented by the machine.

After corrugated board has been trimmed, slit, and sheeted, it is stacked and sent to storage, where the adhesive cures to a full strength. Until the bond is dry and fully cured, the corrugated board may be delaminated by slowly and firmly pulling the liner away from the corrugated sheet.

Since the middle thirties, one of the major advances in corrugating adhesive technology is that disclosed in U.S. Pat. No. 3,355,307, granted Nov. 28, 1967, to John J. Schoenberger and Raymond P. Citko. This patent discloses a single phase corrugating adhesive referred to as a "no-carrier" system, in which partially swollen starch granules are present as a homogeneous phase, suspended in an aqueous, alkaline vehicle. The elimination of the carrier phase permitted substantial operating economies. The no-carrier type corrugating adhesive disclosed and claimed in the Schoenberger-Citko patent was applied and cured in the same manner as the Stein-Hall type adhesive formulations.

Other advances in the corrugating adhesive field related primarily to building in moisture resistance, generally through the addition of synthetic resins, such as urea-formaldehyde, phenol-formaldehyde, and resorcinol-formaldehyde resins.

The Bauer patents represented a significant advance in the art, for their time. Bauer reported that the use of his adhesive systems permitted corrugated board machines to be operated up to 20% faster than would have been possible utilizing prior art adhesive compositions. The prior art compositions included preparations based on sodium silicate and adhesive preparations based on the use of gelatinized starches or modified starches such as dextrins.

In the Stein-Hall type system, according to the teachings of Bauer, the time required to form an adhesive bond between the corrugated interliner and a liner or facer sheet is substantially independent of the rate at which the moisture in the adhesive is driven off by heat or absorbed by the paper. According to Bauer, the time required to form the adhesive bond depended mainly on the time required to cause gelatinization of the granular starch particles suspended in the gelatinized starch carrier phase. As this granular starch gelatinized, water was taken up, and the viscosity of the adhesive was raised rapidly, to form an immediate green bond. Bauer considered that tapioca, rye and potato starches were inherently superior to corn, wheat, and rice starches for making corrugating adhesives in accordance with his developments.

Bauer described four principal factors that he considered to determine the suitability of the starch for use as the latent adhesive component in his system. These four factors were:
1. the time required for complete gelatinization of the granular starch by means of the heat input on the corrugating machine.
2. The temperature at which the starch gelatinizes.
3. the viscosity developed after gelatinization.
4. the degree of tackiness developed after gelatinization However, subsequent developments indicate that the green bond strength depends significantly on the evaporation of moisture from the bond site; Thayer & Thomas, *Analysis Of the Glue Lines in Corrugated Board;* TAPPI; 22nd Corrugated Containers Conference, May 1971.

SUMMARY OF THE INVENTION

It has now been discovered that a select class of starch materials, when used as the adhesive component in a corrugating adhesive composition, demonstrate superior properties. One way to take advantage of these properties is by the use of machine speeds that are ordinarily from 50% to 100% higher than had been considered possible with conventional Stein-Hall type corrugating adhesive compositions, or with the more recently introduced no-carrier corrugating adhesive compositions, at generally the same levels of adhesive usage.

Stated in another way, superior results have been obtained when the primary active adhesive component in a corrugating adhesive formulation is a saponifiable starch ester material which exhibits at least about a 30% greater area under an Instron force-time heating curve and at least about a 30% greater area under an Instron force-time cooling curve, compared with unmodified corn starch under the same test conditions.

Preferred adhesive compositions of the present invention are based on the use of primary adhesive components which are saponifiable starch esters having a saponifiable degree of substitution (D.S.) of at least about 0.015. As used herein, "saponifiable degree of substitution" means the total D.S. of all saponifiable ester groups on the starch molecule. Particularly preferred starch ester materials are starch acetate, starch succinate and starch acetate succinate. One or more of these active adhesive components can be used to advantage either in a Stein-Hall type formulation or in a no-carrier type formulation, with equally superior improvements over the prior art.

The most preferred adhesive component is a starch acetate succinate having a saponifiable degree of substitution (D.S.) in the range from about 0.025 to about 0.045. These D.S. levels represent ranges that are applicable to starch acetate succinate. Other derivatives that are useful in accordance with the invention will have their own preferred D.S. ranges. Generally, if the D.S. level is too low, the derivatized material will not exhibit significant improvement over unmodified corn starch when used in a corrugating adhesive formulation. If the D.S. level is too high, the gelatinization temperature may be unworkable.

The specific materials that have been identified, for use in accordance with the invention, are starch derivatives identified above. These starch derivatives may be prepared immediately prior to use, i.e., in situ at the corrugating machine, or they may be prepared in advance, and may be formulated into corrugating adhesive compositions as with other starch materials that are to be used for such purposes in accordance with prior art practices.

It is also possible to utilize modified starch materials which may be produced from the aforementioned starch esters. These modified starch materials are produced by substantially completely saponifying the starch esters and removing the salts formed thereby. The resulting modified starch material may then be dried. Although the derivative has been substantially completely removed from the starch material, the modified starch retains the beneficial properties of the ester material.

While we do not fully understand the reason why the special materials identified by our invention are superior for use in corrugating adhesives in particular, it can be theorized that they not only develop unusually high viscosity upon gelatinization, but in addition, provide a high green strength without the necessity of solvent evaporation.

While the final form of the useful starch materials of this invention is not known, it is known that the esters materials saponify substantially completely in a short period of time in the environment present in the mixing apparatus on the corrugating machine.

The invention will be better understood by a more detailed explanation of several specific embodiments thereof. All parts and percentages are by weight, on a commercial basis, unless expressly stated to be otherwise. The commercial basis for the starch materials includes about 12% moisture.

DETAILED DESCRIPTION OF THE PREFERRED EMBODIMENTS

The proper selection of the primary active adhesive component is of great importance for the proper practice of the present invention. In preparing saponifiable starch esters for use as the primary active adhesive components, the starting starch material may be derived from any vegetable source. Starches derived from nonwaxy grain sources, such as, for example, corn, wheat, rice, and grain sorghum are preferred. The term "starch" is used broadly herein and encompasses flour, unmodified starch and tailings. Corn starch is a preferred starting starch material.

The initial starch is esterified, as will be described presently, to produce the primary active adhesive component that has the desired characteristics in accordance with the invention.

In a typical corrugating adhesive formulation, it is usual to add borax and caustic to increase the adhesive strength and tack, and to adjust the gelatinization temperature. When using either a carrier-type or a no-carrier type adhesive formulation, the Stein-Hall viscosity of the formulation must be within the conventional range to permit an adequate amount of adhesive to be applied to the flute tips at all machine speeds. Generally, to be tractable on a corrugating machine, as adhesive formulation should have a Stein-Hall viscosity in the range of about 20 sec. to about 100 sec. The optimum Stein-Hall viscosity of the formulation will depend on the particular corrugating machine.

Unless otherwise specified, the materials described and claimed herein are those which are to be added to form the adhesive formulation. In the particular environment of the adhesive formulation, the form of certain materials may be altered. For example, the starch ester will saponify in a typical corrugating adhesive formulation. This will reduce the actual amount of alkali present. The borax may be present in any of several species, or as an equilibrium mixture of these species, depending primarily on the pH of the formulation.

As previously described, it is standard practice in the corrugating industry to add alkali and borax to the adhesive formulations. While formulations which do not include these materials may be used as corrugating adhesives, it is preferred to include both of these materials to the formulations of this invention.

The borax is generally utilized to increase the gel structure of the adhesive paste. However, an excess of borax may have an adverse effect on the cured bond strength. In addition, borax has the tendency to increase the gel temperatures of the formulation. Generally, up to about 5% borax (10 mol) may be incorporated into the formulations. A more usual quantity would be about 2% to about 3%. The percentages are based on the total starch material present in the formulation, including both the primary active adhesive material and the carrier material. If 5 mol borax is to be used instead of 10 mol, it is necessary to compensate for the reduced water of hydration. In no-carrier systems, boric acid may be utilized as a reaction stopper. The boric acid will quickly be converted to a borate and is then able to serve as a substitute for added borax. As used herein, the term "borax" will include those borates which are present due to the addition of boric acid.

Any standard alkali may be used. However, for economic reasons, sodium hydroxide is most commonly utilized. The alkali serves to reduce the gel temperature of the adhesive formulation to a readily tractable point. Generally this will be in the range of from about 145° F. to about 150° F., but may in some applications range from about 140° F. to about 160° F. It is important that large amounts of alkali not be used in any corrugating adhesive formulation, whether conventional or in accordance with this invention, as alkali tends to reduce gel structure formation. Generally up to about 5% alkali (calculated as sodium hydroxide) may be used, based on total starch material in the system. More usual amounts would be from about 3% to about 3.5%.

It is of critical importance to the practice of this invention that at least enough alkali to substantially completely saponify the starch ester be used. The amounts of alkali referred to above are the quantity of alkali in excess of this minimum amount.

The particular starch ester to be used in the practice of this invention is not critical, as long as it will saponify in the environment of a corrugating adhesive formulation. Consequently, inexpensive and simple starch esters, such as starch acetate are preferred. Particularly preferred is the mixed ester, starch acetate succinate.

The starch esters may be obtained commercially, or may be made by any conventional method, such as by reacting unmodified starch with acid anhydrides, acid halides, vinyl esters and the like. The same reagents may be used when utilizing the in situ method of this invention. It is necessary however that the esterification be carried out at a temperature which is below the actual gelatinization temperature of both the unmodified starch and the starch ester.

In addition, the water content of an adhesive formulation should be adjusted so that an extremely tacky adhesive characteristic is obtained immediately after gelatinization. This implies that sufficient water is present for complete gelatinization. It is most desirable that rapid development of tack is obtained upon the application of heat in the corrugating equipment.

The amounts of starch materials utilized in the adhesive formulations of this invention are similar to those utilized in conventional formulations. Generally, the granular starch component of a Stein-Hall type formulation will contain from about 10% to about 25% starch. The final adhesive mixture generally has from about 12% to about 25% of its total starch in the form of the gelatinized carrier.

The starch esters of this invention may also be used as the carrier portion of a Stein-Hall type adhesive. In such instances, it may be possible to reduce the quantity of carrier somewhat due to the greater thickness of these starch esters.

The desirable degree of substitution depends upon the particular initial starch material selected. However, in general, it has been found desirable to utilize a saponifiable D.S. of at least about 0.015. Starch esters having a saponifiable D.S. of at least about 0.015 have been found to satisfy the Instron test criteria, discussed infra, and thereby permit machine speeds at least about 20% greater than those attainable utilizing unmodified corn starch as the primary active adhesive component.

Generally D.S. levels greater than 0.015 will produce even faster machine speeds. It has been found preferable to utilize saponifiable starch esters having a saponifiable D.S. in the range of from about 0.025 to about 0.045. The utilization of such materials will generally permit operation of a corrugating machine at speeds of up to about 100% higher than those attainable using conventional adhesives.

The green strength, and the viscosity of the gelatinized corrugating adhesive that produces the green strength, cannot conveniently be subjected to direct quantitative measurement at the exact site of the bond. However, it appears that the inherent ability of a corrugating adhesive to form higher green strength, which permits improved corrugating speeds, may be predicted by a measurement of the area under an Instron force-time curve of a paste made in a particular manner from the primary active adhesive component that is selected for use in accordance with the present invention.

The Instron force-time curve of a paste of a primary active adhesive component may be determined in accordance with the following procedure.

STANDARD INSTRON METHOD

An Instron Tensile Tester Model TT is fitted with compression load cell "CM". A culture tube approximately 22 mm in diameter and 175 mm high is fitted into a constant temperature chamber. This chamber is a metal sleeve approximately 23 mm in diameter and 116 mm high, wrapped with about 4 feet of 3/16 inch copper tubing and covered with asbestos wrap. The copper tubing is connected to constant temperature baths through appropriate inlets.

The starch slurry to be tested is placed into the culture tube to a depth of 2.75 inches.

The culture tube is lowered into the sleeve, which has been preheated by circulating water at a temperature of 210° F. through the copper tubing. A thermocouple probe having a diameter of 0.184 inch is inserted about 1 inch deep into the top surface of the slurry. Simultaneously the machine and recorder are turned on, with the probe being driven into the slurry at a speed of 0.02 in/min. This heating cycle is continued for 14 min. and then the hot water circulation is stopped. After another minute, ice water is circulated through the tubing and continued for 15 minutes.

The curve generated on the recorder is called a force-time curve. The first 15 minute segment will be referred to as the heating cycle and the second 15 minute segment as the cooling cycle.

The test slurries for use on the Instron are made as follows.

A predetermined quantity of unmodified corn starch is slurried in 110 ml water. A predetermined amount of a 4% w/v borax (10 mol) solution and a predetermined amount of a 20% w/v NaOH solution are added. Sufficient water is added to produce a total additional volume of 60 ml. The resulting slurry is heated at a temperature of 212° F., with agitation for 5 minutes, and then allowed to stand for 5 minutes. It is then immediately added to the second slurry which has been previously prepared.

The second slurry is prepared by slurring 50 gm of the test starch in 165 ml of water. The first slurry is then mixed with this slurry and the admixture stirred for 15 min. It is then immediately tested on the Instron tester.

A sample of unmodified corn starch is run as the test starch under these standard test conditions. The force-time heating and cooling curves are generated as described above and the area under each of these segments is independently determined.

The identical procedure is then followed for the starch material to be tested. The areas under the heating curve for the test starch is compared with the area for unmodified corn starch. The same is done for the areas under the cooling curve. It must be stressed that the areas under each of the segments of the curves are treated independently of each other.

The absolute areas determined in this manner are arbitrary values largely determined by the test procedure. The crucial feature of the test is not these absolute values, but the ratio of the areas for the test starch to the areas for the unmodified corn starch, when performed under the same test conditions. This means that the predetermined amounts of carrier starch, borax and sodium hydroxide are identical.

While the Instron test does not duplicate exactly the viscosity and gel structure on the glue line, it does give a relative measurement of the ability of a particular primary adhesive component to develop high green strength in a corrugating bonding environment.

It has been found that to produce the desired 20% improvement in machine speed, the ester material must exhibit at least about a 30% greater area under both the Instron heating and cooling curves compared to unmodified corn starch. In other words, a saponifiable starch ester which will exhibit a 30% Instron improvement (greater area) under both heating and cooling curves will produce machine speeds at least about 20% faster than machine speeds obtainable using unmodified corn starch, on the same machine.

The useful starch ester materials may also be defined as having a total saponifiable degree of substitution (D.S.) of at least about 0.015. The upper limit on saponifiable D.S. is economic and functional. It is necessary that the material have a gel temperature high enough so that it will not gelatinize prior to use; such as during manufacuture of the derivative or during formulation of the adhesive composition. While the exact upper limit on saponifiable D.S. will depend on the particular substituent being used, in general, for esters of monocarboxylic acids it will be about 0.1 and for mono-esters of dicarboxylic acids about 0.06.

It is known that in the environment of the adhesive formulation, the ester will saponify in a relatively short time. This means that the ester will have substantially completely saponified prior to its application to the flute tips. The exact form of the saponified starch material is not known. It is possibly a complex with either the caustic or borax which are generally present in the system.

It is believed that a portion of the improvement in machine speed may be ascribed to a reduced alkali level in the formulation. As the ester material saponifies, some of the alkali is used up.

Certain of the beneficial properties of the starch esters are retained in the saponified product. Prior to actually being applied to the flute tips, the ester has substantially completely saponified. It has been found that a modified starch material may be produced by saponifying the starch ester. The saponification is carried out in the presence of alkali and may further include borax in the saponification medium. The modified material may then be dried. This process, i.e., esterification followed by saponification yields a material which is different from the original unmodified starch material. This modified material may be used in a corrugating adhesive formulation in a manner similar to the use of the starch esters. Improved green bond strength compared with unmodified corn starch is found. The exact mechanism of the modification is not known, but may be a physical disruption of the granules, or may be a small amount of a complex formed between the alkali and the starch.

The use of a reduced quantity of alkali in the corrugating adhesive formulation does not account for all of the machine speed improvement. When unmodified corn starch and a starch ester in accordance with this invention are run at identical actual alkali levels, machine speeds are still greatly faster using the starch ester materials.

The starch esters may be formed in situ at the corrugating machine when preparing the adhesive formulation. It is merely necessary to add an ester forming reagent to the formulation. The conditions are those which will permit very rapid esterification, followed by irreversible saponification to take place. The esterifying reagents are the aforementioned conventional materials. The quantity of reagent to be added is that amount which would, in the absence of saponification, produce a product having a saponifiable D.S. suitable for use in accordance with this invention. Generally, a reagent such as acetic anhydride will have a reaction efficiency of about 50% to about 70% under the conditions found in a corrugating adhesive formulation.

The order of addition of the materials to the adhesive formulation is not critical to the success of the in situ method. It is, of course, necessary that the esterification reagent not be allowed to remain in an environment for any lengthy period of time where it might, at least in part, decompose.

In order to more fully understand the invention the following demonstrations of specific embodiments of the invention are described. They are illustrative and informative in nature and in no way are intended to limit the scope of the invention.

EXAMPLE I

Comparative Corrugated Board Production Runs

In order to demonstrate that the corrugating adhesives of the present invention provide improvements over conventional unmodified starch Stein-Hall adhesive formulations, it was necessary to establish a limit, above which speed, conventional starch adhesives no longer bind the corrugating board sufficiently to prevent delamination during the subsequent operations, and then determine at what machine speed corrugated board using adhesives prepared in accordance with the present invention could be produced before they reached the failure point.

The corrugated board manufactured in all tests of this example was a double backer board consisting of a 26 pound corrugated sheet positioned between two 42 pound Kraft liners. A commercial double-backer corrugated paper machine was used. All hot plate temperatures were set at 300° F. for this trial. Initially the glue clearance of the adhesive applicator was set at 0.014 in. A Stein-Hall type conventional corrugating adhesive, for use as a control, and corrugating adhesive formulations prepared in accordance with the present invention, were made as tabulated below.

Conventional Double Backer Formula

Primary Mixer

Add 10.0 gal. water
Add 20.0 lb. unmodified corn starch
Heat to 150° F.
Add 3.3 lb. NaOH dissolved in 2.0 gal. water
Agitate for 15 min.
Then add 10.0 gal. cooling water
Mix for 10 min. and hold at 110° F.

Secondary Mixer

Add 30 gal. water and heat to 90° F.
Add 3.4 lb. 10 mol borax
Add 100 lb. unmodified corn starch
Add primary to secondary over a period of 30 min. and hold at 110° F.
Adjust viscosity to 60 sec. with 4.5 gal. water

Double Backer Formula According to the Present Invention

Primary Mixer

Add 10.0 gal. water
Add 19.0 lb. unmodified corn starch
Heat to 150° F.
Add 3.9 lb. NaOH dissolved in 2.0 gal. water
Agitate for 15 min.
Add 10.0 gal. cooling water and hold at 110° F.

Secondary Mixer

Add 30.0 gal. water and heat to 90° F.
Add 1.5 lb. 10 mol borax
Add 100 lb. starch acetate succinate (0.027 D.S. acetate, 0.01 D.S. succinate)
Add primary to secondary over a period of 30 min. and hold at 110° F.
Mix 5 min. and add 1.5 lb. 10 mol borax
Add 4.5 gal. water to adjust viscosity in 60 sec.

The adhesive properties of these formulations were determined to be as indicated below.

| | Double Backer Adhesive Properties | | |
|---|---|---|---|
| | % Solids | Stein-Hall Viscosity Sec. | Temp. F. |
| Conventional | 19.1 | 65 | 110 |
| Acetate/Succinate | 20.0 | 45 | 110 |

Both of these adhesive formulations were evaluated, successively, on the same corrugating machine.

Using the control adhesive above, the maximum speed obtainable on the corrugating machine, before the corrugated board began to delaminate at the cutting knife, was 450 fpm.

Using the starch acetate succinate as the raw starch portion of the Stein-Hall double backer adhesive formulation, speeds of 600 feet per minute were achieved. At this point, the glue clearance on the double backer applicator was increased from 0.014 inches to 0.016 inches and the corrugating machine was run at 700 feet per minute, or 55% better than the control, with excellent double backer green strength. Above this speed the single facer corrugating machine, which was supplying the single face corrugated paper to the double backer, would not keep up due to the fact that the adhesive formulation being used in the single facer stage was a typical conventional unmodified starch adhesive and not enough heat could be applied by the machine to cause sufficiently rapid gelatinization of that adhesive.

However, with the single facer bridge full of board made at lower machine speeds, the double backer section could be run in brief spurts at speeds well over 800 feet per minute. The limitation on these spurts occurred when unbonded single facer sheets would reach the double backer glue machine. It is apparent, therefore, that the starch acetate succinate adhesive will produce good double backer corrugated board at corrugator speeds considerably in excess of 700 feet per minute.

EXAMPLE II

Corrugated Board Production Runs

A further test of corrugating was conducted using the same corrugating machine, and substantially the same operating conditions, as for the runs in Example I. The machine was used for making board using 42 pound liners and a 26 pound corrugated medium, with glue clearances of 0.013 inches and 0.014 inches.

The starch derivative used as the primary adhesive component was characterized as follows. It was a starch acetate succinate having a D.S. acetate=0.011; D.S. succinate=0.015. It was found that an adhesive formulation made up as described below could be run successfully at quite high machine speeds. The formulation was as follows:

| Primary | |
|---|---|
| Water | 50 gal. |
| Unmodified corn starch | 90 lbs. |
| Caustic Soda (dissolved in 5 gals. water) | 20 lbs. |
| Heat to 160° F. and hold 15 minutes | |
| Water | 33 gals. |
| Secondary | |
| Water | 200 gals. |
| Borax (10 mol) | 9 lbs. |
| Starch Acetate Succinate | 500 lbs. |

-continued

| | |
|---|---|
| Add the primary over a period of 30 min. Add additional Borax (10 mol) | 5 lbs. |

With the glue settings set a 0.013 inches, the corrugator could be run efficiently at 700 feet per minute. Decreasing the glue clearances to 0.009 inches allowed the attainment of sustained corrugator speeds of over 800 fpm. At this point the corrugating machine had reached its practical limit and 62 pound liners were then substituted for the 42 pound liners.

With the heavier liner, the corrugating machine efficiently produced corrugated board at speeds of 650 fpm. at a setting of 350° F. on the corrugator hot plates. Conventional starch adhesives have a limit of 300-500 fpm. at 300° F. and 350-400 fpm at 350° F. hot plate temperatures when using these liners on this machine. Corrugating efficiency was dramatically superior, using the formulations of the invention.

EXAMPLE III

Additional Production Runs; Stein-Hall Formulations

Additional runs were made on the same machine in accordance with the last-mentioned procedure of Example II using 62 pound liners with primary adhesive components characterized as follows:

Starch Derivative

Starch acetate succinate
(D.S. acetate=0.013;
D.S. succinate=0.016)
Starch acetate succinate
(D.S. acetate=0.018;
D.S. succinate=0.014)

The starch derivative identified as (a) was prepared in an adhesive formulation as described in Example II, and used on a corrugating machine with glue clearances of 0.007 inches with the hot plate set at 300° F. Initially machine speeds of 600 fpm were attained. As the glue clearance was opened up to 0.010 inches, machine speeds of up to 750 fpm were achieved. When the hot plate temperatures were raised to 350° F., machine speeds of 775 fpm were attained, with satisfactory board production.

When an adhesive formulation as described in Example II, incorporating the starch derivative identified above as (b), was run on the corrugating machine with the glue clearances at 0.007 inches, and the hot plates set at 350° F., corrugated board was made successfully at 800 fpm.

EXAMPLE IV

No-Carrier Type Formulation

A small-scale demonstration was conducted with an adhesive formulation (IV-1) containing 18-20% of starch acetate succinate (D.S. acetate 0.0266; D.S. succinate 0.018) as the primary adhesive component, in an aqueous slurry. This is a equivalent, in composition, to a conventional 11-bag mix in a mill (i.e., equivalent to a formulation containing 11 bags of the adhesive component in approximately 650 gallons of total adhesive).

A second demonstration was conducted with an adhesive formulation (IV-2) made of a mixture of unmodified corn starch and the primary adhesive component, in such proportions that on a mill scale, 2 of the 11 bags (i.e., about 18%) would be unmodified corn starch, the remainder being the primary adhesive component.

Stein-Hall viscosity measurements were made on each of these formulations after they were made up ready for use. The make-up precedure was that described in U.S. Pat. No. 3,355,307, and was as follows. 250 g of starch material was slurried in 890 ml of water at 105° F. 275 ml of 4.0% sodium hydroxide (caustic) was added to the starch slurry at room temperature over a period of 4.5 min. The reaction was then stopped at 600 cps. with 4.7 g boric acid. The resulting paste consisted in each case of a substantially homogeneous suspension of partially swollen granules.

The Stein-Hall viscosity observations were made at once, and then after each formulation had been stored for 24 hours, at 100° F. with mild agitation. Viscosities were similar to those for typical conventional formulations.

| Viscosities of No-Carrier Adhesive Formulations | | | |
|---|---|---|---|
| | IV-1 | IV-2 | Typical conventional formulation |
| Stein-Hall Viscosity seconds after makeup | 21 | 20 | 21 |
| after overnight storage | 20 | 20 | 20 |

EXAMPLE V

An adhesive composition having the following formulation was prepared.

| Primary Mixer | |
|---|---|
| Water | 100 gal. |
| Unmodified corn starch | 220 lb. |
| NaOH (dissolved in 10 gal.) | 40 lb. |
| Heat to 160° F. and hold | 15 min. |
| Water | 66 gal. |
| Secondary Mixer | |
| Water | 380 gal. |
| Borax (10 mol) | 18 lb. |
| Starch acetate succinate | 1000 lb. |
| Drop primary over 30 minutes | |
| Water | 20 gal. |
| Borax (10 mol) | 10 lb. |

This compositin was run on a commercial machine using a 90 lb. liner on the single face side and two 90 lb. liners laminated on the machine on the double backer side. Good bonding was observed at speeds at 320 fpm. Conventional adhesives can normally be run at about 200-250 fpm under the same test conditions.

The same composition was used as a laminating adhesive with satisfactory results. However, no numerical data was obtained as this particular machine was able to operate at its top speed when using either a conventional formulation or a formulation in accordance with this invention.

EXAMPLE VI

Another batch of adhesive was prepared using the same starch acetate succinate as in Example V. The amount of carrier starch was 210 lbs; the remainder of the formulation identical to that of Example V. Using the identical 90, 90/90 laminate, liners as in Example V, speeds of 420 fpm were achieved. A further run was made where the double backer liner consisted of a 90 lb.

liner laminated on the machine using this adhesive formulation to a 69 lb. liner. Speeds of 410 fpm. were obtained. The average speeds for both of these grades of board was 200 fpm. using conventional adhesives. The machine speed was not limited in these two cases by glue line failure, but by the possibility of drive overload at higher speeds.

EXAMPLE VII

To a slurry of 24.6 g of unmodified corn starch in 330 ml water, 25 ml of a 2.75% (wt/vol) borax xolution, 45 ml of 3.09% (wt/vol) NaOH and a mixture of 0.018 mole of succinic anhydride and 0.048 mole of acetic anhydride were added. A laboratory evaluation of the resulting slurry indicated it to have superior adhesive properties.

EXAMPLE VIII

Example VII was repeated except that the succinic anhydride was replaced by adipic anhydride. The product was again evaluated as being a superior corrugating adhesive.

EXAMPLE IX

Commercial runs were made on a series of products using the following formulations.

| Primary Mixer | |
|---|---|
| Water | 50 gal. |
| Unmodified corn starch | 100 lbs. |
| NaOH | 17 lbs. |
| Heat to 160° F. and hold 15 min. | |
| Water | 33 gal. |
| Secondary Mixer | |
| Water | 200 gal. |
| Borax (10 mol) | 17 lbs. |
| Test starch | 500 lbs. |
| Drop primary over 30 min. | |

When using the ester materials, the NaOH was increased to 20 lbs. and the borax to 18 lbs.

The formulations were run using 60 lb. liners with glue settings of 0.020" on the single facer and 0.018" on the double backer.

| Run | | Machine speed, fpm |
|---|---|---|
| 1. Unmodified corn starch | | 425 |
| 2. Starch acetate succinate | (DS 0.016) | 525 |
| 3. Starch acetate succinate | (DS 0.024) | 575 |
| 4. Starch acetate | (DS 0.020) | 625 |

EXAMPLE X

Instron force-time curves were produced following the standard method for the following starch materials.

| Material | Heat Cycle % Imp. | Cool Cycle % Imp. | D.S. |
|---|---|---|---|
| acetate/succinate | 40 | 78 | .016 (a) |
| acetate/succinate | 53 | 98 | .024 |
| acetate/succinate | 62 | 95 | .024 (b) |
| acetate/succinate | 74 | 134 | .021 |
| acetate | 55 | 113 | .020 (c) |
| acetate/succinate | 71 | 163 | .039 (d) |
| acetate/succinate | 88 | 170 | .026 (e) |
| acetate/succinate | 22 | 75 | .024 (f) |
| acetate/succinate | 44 | 88 | .028 (g) |
| acetate/succinate | 68 | 118 | .026 (h) |

-continued

| Material | Heat Cycle % Imp. | Cool Cycle % Imp. | D.S. |
|---|---|---|---|
| acetate/succinate | 79 | 122 | .023 (i) |

(a) This is material from Example IX, Run 2.
(b) This is material from Example IX, Run 3.
(c) This is material from Example IX, Run 4.
(d) This is material from Example I.
(e) This is material from Example V.
(f) This product showed only 13% machine speed improvement.
(g) This is material from Example III, Run a.
(h) This is material from Example III, Run b.
(i) This product showed 38% machine speed improvement.

EXAMPLE XI

Standard Instron force-time area were determined for the following starch materials.

| Material | Heat Cycle % Imp. | Cool Cycle % Imp. | D.S. |
|---|---|---|---|
| Maleate | 143 | 196 | .037 |
| Phthalate | 138 | 64 | .031 |
| Proprionate | 72 | 147 | .035 |
| Butyrate | 74 | 133 | .041 |
| Iso-butyrate | 75 | 110 | .036 |
| Acetate | 110 | 337 | .102 |
| Acetate | 67 | 101 | .033 |
| Succinate | 57 | 46 | .014 |
| Succinate | 76 | 174 | .044 |
| Acetate | 80 | 336 | .080 |
| Succinate | 76 | 108 | .024 |
| acetate/succinate | 86 | 228 | .058 |
| acetate/succinate | 63 | 113 | .029 |
| acetate/succinate | 27 | 25 | .014 |
| acetate/succinate | 31 | 20 | .009 |
| Proprionate | 40 | 42 | .018 |
| Proprionate | 26 | 35 | .009 |

EXAMPLE XII

The material from Example I was saponified in the presence of NaOH and borax. It was then washed with water to remove the caustic, borax and salts. A standard Instron force-time determination was made. The material showed 58% heating cycle improvement and 82% cooling cycle improvement.

EXAMPLE XIII

Example XII was repeated using the material of Example V. This showed 58% heating cycle improvement and 102% cooling cycle improvement.

When an acid neutralization step was introduced, no significant improvement compared with unmodified corn starch was shown.

While the starch acetate succinate, and the other specific primary adhesive components identified herein, produce superior results as compared to formulations based on unmodified corn starch and other conventional materials, generally they may be used in making up corrugating adhesive formulations in the same general manner and in substantially the same proportions as conventional materials, such as unmodified corn starch, would be used. Generally, the primary adhesive components of this invention may be used to replace a portion, or preferably all, of the conventional primary adhesive components in both Stein-Hall type and no-carrier type adhesive formulations. Specific variations in amounts of components and the addition of other components may be made in the formulations using these primary adhesive components in the same manner as are made for conventional adhesive formulations. These variations are well known to those skilled in the art.

The details of the Stein-Hall type adhesive system may be found in the aforementioned U.S. Pat. Nos. 2,051,025 and 2,102,937, the disclosures of which are incorporated herein. The details of no-carrier type adhesive systems may be found in the disclosure of U.S. Pat. No. 3,335,307, which is incorporated herein. When utilizing our novel compositions in a no-carrier environment, reaction stoppers such as acid anhydrides and acid chlorides may be used. These may be broadly defined as acid or acid producing materials. Careful selection of the reaction stopper may thus allow the same material to serve as reaction stopper and esterifying reagent.

It is, of course, necessary that the final bond strength, as contrasted with the green bond strength be sufficiently high to permit all conventional use of the product. Pin adhesion tests have shown that the final bond strengths using the adhesive formulations of this invention are substantially equal to bond strengths of conventional adhesives.

The adhesive formulations of this invention are also useful in applications other than producing corrugated paperboard. For example, these formulations can find application in tube winding and manufacturing laminated board and multiwall paper sacks.

In addition, the conventional additives which will impart water-resistance to the cured bonds may also be incorporated into the formulation.

While the invention has been described in connection with specific embodiments thereof, it will be understood that it is capable of further modification, and this application is intended to cover other variations, uses, or adaptions of the invention following, in general, the principles of the invention and including such departures from the present disclosure as are within known or customary practice in the art to which the invention pertains and as may be applied to the essential features hereinbefore set forth, and as are within the scope of the invention.

What is claimed is:

1. In a process for the preparation of a corrugating adhesive composition of the no-carrier type, comprising the steps of preparing a heated reaction mixture of ungelatinized starch material, water and alkali, allowing the reaction to proceed until a Stein-Hall viscosity of about 20 to about 90 seconds is reached, and adding a reaction stopper to the mixture, the improvement which consists of replacing at least a portion of the starch material with a saponifiable starch ester derived from a non-waxy grain source characterized as having at least about 30% greater area under an Instron force-time heating curve, and at least about 30% greater area under an Instron force-time cooling curve compared with unmodified corn starch under the same test conditions and having a saponifiable D.S. of at least about 0.015.

2. A process according to claim 1, the improvement wherein said saponifiable starch ester is a corn starch acetate succinate.

3. A process in accordance with claim 1, the improvement wherein said saponifiable starch ester is a corn starch acetate succinate having a saponifiable D.S. in the range of from about 0.025 to about 0.045.

4. An adhesive composition for use in a high speed corrugating process which comprises an aqueous dispersion of the reaction product of:
(1) a starch material formed by saponfication of a starch ester derived from a non-waxy grain source having a saponifiable degree of substitution of at least about 0.015 and characterized as having at least about 30% greater area under an Instron force-time heating curve and at least about 30% greater area under an Instron force-time cooling curve than unmodified corn starch under the same test conditions; and
(2) an amount of alkali sufficient to substantially completely saponify said ester and to render said composition effective in said process.

5. A composition in accordance with claim 4, wherein said composition further includes up to about 5% additional alkali and up to about 5% borax (10 mol), based on total starch material, commercial basis.

6. A composition in accordance with claim 4, wherein said saponifiable starch ester is a saponifiable corn starch ester.

7. A composition in accordance with claim 4, wherein said saponifiable starch ester is selected from the group consisting of starch acetate, starch succinate, starch acetate succinate and mixtures thereof.

8. A composition in accordance with claim 4, wherein said saponifiable starch ester is a corn starch acetate succinate, having a saponifiable degree of substitution in the range from about 0.025 to about 0.045.

9. In a composition for use in a high speed corrugating process which comprises an aqueous dispersion of an adhesive in a carrier phase, the improvement wherein said adhesive is the composition of claim 4.

10. A composition in accordance with claim 9, wherein said carrier phase comprises a gelantinized, unmodified corn starch.

11. A composition in accordance with claim 9, wherein said carrier phase comprises carboxymethylcellulose.

12. A composition in accordance with claim 9, wherein said composition further includes up to about 5% additional alkali and up to about 5% borax (10 mol), based on total starch material, commercial basis.

13. A composition in accordance with claim 9, wherein said saponifiable starch ester is a saponifiable corn starch ester.

14. A composition in accordance with claim 9, wherein said saponifiable starch ester is selected from the group consisting of starch acetate, starch succinate, starch acetate succinate, and mixtures thereof.

15. A composition in accordance with claim 9, wherein said saponifiable starch ester is a corn starch acetate succinate, having a saponifiable D.S. in the range from about 0.025 to about 0.045.

* * * * *

UNITED STATES PATENT AND TRADEMARK OFFICE
CERTIFICATE OF CORRECTION

PATENT NO. : 4,297,144

DATED : October 27, 1981

INVENTOR(S) : Gary H. Klein and Merle J. Mentzer

It is certified that error appears in the above-identified patent and that said Letters Patent are hereby corrected as shown below:

On the title page, "[75] Inventors: Gary H. Klein, LaGrange; Howard L. Arons, LaGrange Park; Joseph F. Stejskal, Brookfield; Donald G. Stevens, Clarendon Hills; Henry F. Zobel, Darien, all of Ill." should read -- [75] Inventors: Gary H. Klein, LaGrange, and Merle J. Mentzer, Mokena, both of Ill.-- and "[73] Assignee: CPC International Inc., Inglewood Cliffs, N. J." should read -- [73] Assignee: CPC International Inc., Englewood Cliffs, N. J. --.

Column 2, line 12, "As" should read --An--.
Column 4, line 60, "as" should read --an--.
Column 5, line 17, "temperatures should read --temperature--.
Column 11, line 61, "a" should be deleted.
Column 12, line 48, "compositin" should read --composition--.
Column 12, line 51, "at" should read --of--.
Column 14, line 16, "area" should read --areas--.
Column 15, line 8, "3,335,307" should read --3,355,307--.
Column 13, line 11, "xolution" should read --solution--.
Column 15, lines 51 and 52, after "of" insert --from--.

Signed and Sealed this

Seventeenth Day of January 1984

[SEAL]

Attest:

GERALD J. MOSSINGHOFF

Attesting Officer

Commissioner of Patents and Trademarks